(12) United States Patent
Yoshizawa

(10) Patent No.: US 9,264,578 B2
(45) Date of Patent: Feb. 16, 2016

(54) IMAGE PROCESSING APPARATUS, IMAGE PROCESSING METHOD AND COMPUTER READABLE RECORDING MEDIUM STORING PROGRAM

(71) Applicant: Konica Minolta, Inc., Chiyoda-ku (JP)

(72) Inventor: Masanori Yoshizawa, Hino (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/574,814

(22) Filed: Dec. 18, 2014

(65) Prior Publication Data

US 2015/0181078 A1 Jun. 25, 2015

(30) Foreign Application Priority Data

Dec. 19, 2013 (JP) ................................ 2013-262179

(51) Int. Cl.
  H04N 1/405 (2006.01)
  H04N 1/52 (2006.01)
(52) U.S. Cl.
  CPC .............. H04N 1/4051 (2013.01); H04N 1/52 (2013.01)
(58) Field of Classification Search
  None
  See application file for complete search history.

(56) References Cited

U.S. PATENT DOCUMENTS

| | | | | |
|---|---|---|---|---|
| 6,014,500 | A * | 1/2000 | Wang | 358/1.9 |
| 6,930,801 | B2 * | 8/2005 | Inoue | 358/3.14 |
| 7,431,413 | B2 * | 10/2008 | Mizutani et al. | 347/15 |
| 7,684,070 | B2 * | 3/2010 | Sakamoto | 358/1.15 |
| 7,701,594 | B2 * | 4/2010 | Shiraishi | 358/1.13 |
| 7,760,400 | B2 * | 7/2010 | Ishii et al. | 358/3.22 |
| 7,764,402 | B2 * | 7/2010 | Kakutani et al. | 358/3.13 |
| 7,961,355 | B2 * | 6/2011 | Kakutani | 358/3.13 |
| 8,208,176 | B2 * | 6/2012 | Takahashi et al. | 358/3.06 |
| 2006/0197992 | A1 * | 9/2006 | Wang | 358/3.19 |
| 2007/0258110 | A1 * | 11/2007 | Kakutani et al. | 358/3.16 |
| 2012/0163713 | A1 * | 6/2012 | Fukuda | 382/165 |
| 2013/0010339 | A1 * | 1/2013 | Yoshizawa | 358/505 |

FOREIGN PATENT DOCUMENTS

JP 2012138822 A 7/2012
JP 2013-017109 A 1/2013

OTHER PUBLICATIONS

Notification of Reasons for Refusal issued by the Japanese Patent Office on Nov. 10, 2015, in Japanese Patent Application No. 2013-262179, filed on Dec. 19, 2013, with full English translation (6 pages).

* cited by examiner

*Primary Examiner* — Dung Tran
(74) *Attorney, Agent, or Firm* — Buchanan Ingersoll & Rooney PC

(57) ABSTRACT

An image processing apparatus which sets threshold value matrices for performing screen processing using the threshold value matrices for respective pieces of image data for a plurality of colors according to an output image, the apparatus including: an allocation section which distributes and allocates memories to the respective threshold value matrices used for the respective pieces of the image data for the plurality of colors within a range that a total of memory allocation amounts to the threshold value matrices is equal to or less than a predetermined upper limit size; a setting section which sets the threshold value matrices in sizes according to the respective memory allocation amounts; and a storage section which stores the set plurality of threshold value matrices in respective allocated memory areas.

12 Claims, 3 Drawing Sheets

IMAGE PROCESSING APPARATUS, IMAGE PROCESSING METHOD AND COMPUTER READABLE RECORDING MEDIUM STORING PROGRAM

BACKGROUND OF THE INVENTION

1. Field of the Invention

The present invention relates to an image processing apparatus, an image processing method and a computer readable recording medium storing a program.

2. Description of Related Art

Conventionally, in image forming apparatuses which form images on recording media by using toner or ink, halftone images have been formed by screen processing in order to express half tones. As the screen processing, there is widely used a systematic dither method for performing binarization on the basis of large/small relationships between pixel values of a bitmap image and the respective threshold values regulated by threshold value matrices.

The systematic dither method includes AM modulation (halftone dot screen) for changing sizes of halftone dots according to gradation and FM modulation (FM dither method) for changing the number (frequency) of halftone dots to be dotted, each of the methods being used for image formation. However, image forming apparatuses using the methods do not necessarily output color dots of respective pixels isotropically due to the difference in characteristics according to the image formation, especially, due to the difference in characteristics according to the output in a conveyance direction (sub scanning direction) and its vertical direction (main scanning direction) of recording medium. Accordingly, there are generated portions where halftone dots are crushed or interrupted together in specific positions or directions due to the arrangement of threshold values in threshold value matrices. Since a threshold value matrix is normally applied repeatedly in a tiled manner to image data which is a forming target, as a result, there is a problem (artifacts) that artificial patterns are visually recognized in the output image due to the non-uniformity in density being repeatedly generated with an application cycle of dither matrix.

As for the problem, Patent Document 1 (Japanese Patent Application Laid Open Publication No. 2013-17109) discloses a technique for reducing cyclic visual recognition of crush and void of halftone dots by setting arrangement of threshold values in the main scanning direction and the sub scanning direction of a dither matrix with a frequency ratio according to the ratio of line width of thin line in the main scanning direction to line width of thin line in the sub scanning direction which were actually measured, and preventing the output overlapping patterns for each color from being repeated every cycle by making the sizes of dither matrices different from each other for the respective colors of color output.

On the other hand, the patterns which appear in a cyclic way vary in the degree of profile (visibility level of patterns) depending on various conditions. One of the various conditions is spatial period dependency of patterns. Accordingly, there is a conventional method for reducing visibility by appropriately adjusting sizes of dither matrices.

However, such visibility of artifacts can vary depending on combination of the above-mentioned various conditions. Then, conventional configurations have a problem that allocation amounts of memories corresponding to the sizes of threshold matrices are fixed and it is difficult to set threshold value matrices flexibly and easily.

SUMMARY OF THE INVENTION

An object of the present invention is to provide an image processing apparatus, an image processing method and a computer readable recording medium storing a program that can allocate a memory to a threshold value matrix for an image of each color flexibly and appropriately depending on the condition of image formation.

In order to achieve at least one of the above objects, according to one aspect of the present invention, there is provided an image processing apparatus which sets threshold value matrices for performing screen processing using the threshold value matrices for respective pieces of image data for a plurality of colors according to an output image, the apparatus including: an allocation section which distributes and allocates memories to the respective threshold value matrices used for respective pieces of the image data for the plurality of colors within a range that a total of memory allocation amounts to the threshold value matrices is equal to or less than a predetermined upper limited size; a setting section which sets the threshold value matrices in sizes according to the respective memory allocation amounts; and a storage section which stores the set plurality of threshold value matrices in respective allocated memory areas.

Preferably, in the above image processing apparatus, the setting section sets an arrangement number of each of the threshold value matrices to be a power of 2.

Preferably, in the above image processing apparatus, the allocation section sets the memory allocation amounts to the plurality of threshold value matrices so as to set a largest memory allocation amount to a threshold value matrix for an image of a color, among the threshold value matrices for the images of the plurality of colors, which has a highest visibility with respect to a condition according to image formation.

Preferably, in the above image processing apparatus, the allocation section allocates the memories to the threshold value matrices for the image data of the plurality of colors so as to allocate a memory, at a larger memory allocation ratio, to a threshold value matrix for an image of a color having a higher visibility with respect to the condition according to the image formation.

Preferably, the above image processing apparatus further includes an operation section which receives an input operation by a user, and the allocation section determines a size of a threshold value matrix on the basis of the size input via the operation section and allocates a memory to the threshold value matrix.

Preferably, in the above image processing apparatus, the setting section sets a resolution of a threshold value matrix to be equal to or less than a resolution according to image formation of the image data.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DETAILED DESCRIPTION OF THE PREFERRED EMBODIMENT

Hereinafter, an embodiment of the present invention will be described with reference to the drawings.

Figure 1:
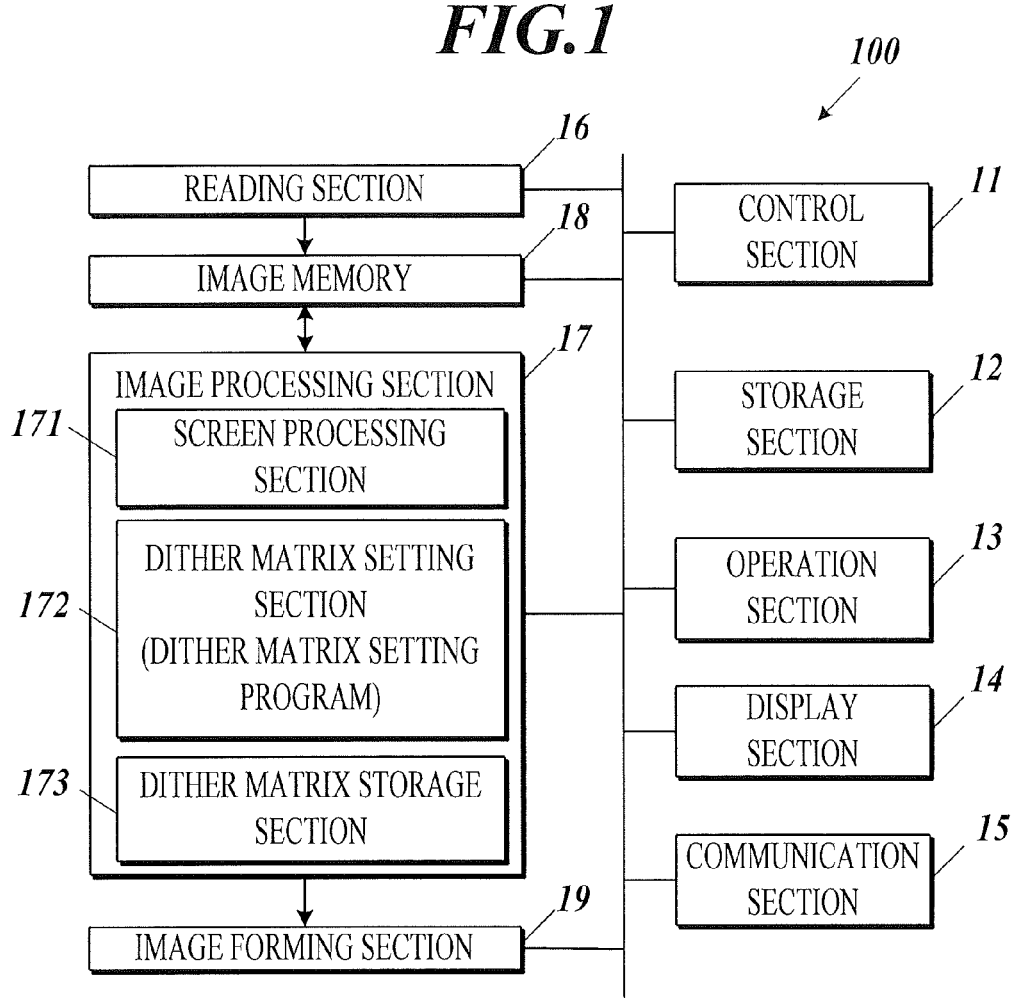
FIG. 1 is a block diagram showing an internal configuration of an image forming apparatus in an embodiment of the present invention.

FIG. 1 is a block diagram showing an internal configuration of an image forming apparatus including an image processing section which is an embodiment of an image processing apparatus according to the present invention.

An image forming apparatus 100 includes a control section 11, a storage section 12, an operation section 13, a display section 14, a communication section 15, a reading section 16, an image processing section 17, an image memory 18, an image forming section 19 and such like.

The control section 11 integrally controls operations of the sections in the image forming apparatus 100. The control section 11 including a CPU (Central Processing Unit) and a RAM (Random Access Memory), and reads out various control programs stored in the storage section 12 to perform various types of arithmetic processing according to the control operations. For example, the control section 11 makes the image processing section 17 perform image processing of image data which is input and stored in the image memory 18 and makes the image forming section 19 form an image by using the processed image data.

The storage section 12 stores programs, data, setting and such like which are readable by the control section 11. As the storage section 12, for example, one or a plurality of readable and writable recording medium or media such as an HDD (Hard Disk Drive), an SSD (Solid State Drive), a flash memory and a ROM (Read Only Memory) can be used.

The operation section 13 includes a touch sensor integrally formed with the display section 14, operation keys and such like, and receives input operations by a user by outputting, to the control section 11, an operation signal according to user's touch operation to the display screen or a pressing operation of operation keys.

The display section 14 displays an operation screen, status and such like according to a control signal from the control section 11. Though the display section 14 is not especially limited, for example, a liquid crystal display (LCD) for display by dot matrix format is used.

The communication section 15 is an interface for communicating with a server or such like on network according to the instruction from the control section 11. The communication section 15 is, for example, a wireless communication module by a network card and wireless LAN (IEEE 802.11n). The communication section 15 receives image data of an image forming target and setting data according to a print job from an external device such as a computer and a printer server, and outputs a status signal or such like.

The reading section 16 reads (scans) a document by a predetermined resolution, and generates image data in bitmap format of the resolution for each of the three colors (three wavelengths) that are R (red), G (green) and B (blue). The generated image data is output to the image memory 18 to be held.

The image processing section 17 performs various types of processing for converting the obtained image data into a form suitable for the image formation by the image forming section 19. The image processing section 17 analyzes PDL (Page Description Language) data of the image forming target image obtained from outside to create intermediate data, and performs processing (rasterizing processing) for converting the data into image data (raster image data) in bitmap format by each color of C (cyan), M (magenta), Y (yellow) and K (black) on the basis of the intermediate data, for example. The image processing section 17 includes a screen processing section 171, a dither matrix setting section 172 (allocation section and setting section) and a dither matrix storage section 173 (storage section). The image processing section 17 further performs, with respect to the raster image data, halftone processing according to the image forming section 19 by using dither matrices (threshold value matrices) and performs processing for converting the data into output image data.

The image processing section 17 includes a dedicated CPU, a storage unit such as a RAM and HDD which is readable and writable and a logic circuit, and the processing of screen processing section 171 and the dither matrix setting section 172 is performed by using the CPU and such like. These processing may be performed together with other processing by the CPU and RAM of the control section 11. The processing of the dither matrix setting section 172 is performed by software control by reading out a program stored in the storage unit in the image processing section 17 into the RAM and executing the program.

The screen processing section 171 performs halftone processing by the systematic dither method using preset dither matrices and converts the raster image data into binary data (output image data). The data of dither matrices is generated on the basis of operations of the dither matrix setting section 172 or read out from the storage unit in the image processing section 17 and stored in the dither matrix storage section 173.

The image forming section 19 forms an image on the recording medium on the basis of raster image data which is screen-processed.

Specifically, the image forming section 19 includes a combination of exposure unit, developing unit and photoreceptor for each of the colors C, M, Y and K. The exposure unit performs optical scanning on the charged and rotating photoreceptor, and performs exposure to the portion corresponding to each pixel of the photoreceptor with the amount of light based on the image data to form an electrostatic latent image. The developing unit develops the electrostatic latent image formed on the photoreceptor with toner. The images of colors formed on the four photoreceptors in such way are transferred onto the recording medium via an intermediate transfer belt or the like so as to be superposed on each other, and fixing processing is performed by a fixing device. At this time, there can be generated slight unevenness in the formed halftone image since the light beam output from the exposure unit cannot necessarily expose the photoreceptor isotropically, for example.

Next, setting of dither matrix in the image forming apparatus 100 of the embodiment will be described. In the screen processing section 171 of the image forming apparatus 100, screen processing is performed by dither matrices which are separately set for raster image of the respective colors C, M, Y and K. The dither matrices corresponding to the images of respective colors C, M, Y and K are stored together in the dither matrix storage section 173. The dither matrix storage section 173 is a memory which can be read out rapidly and is a RAM, here.

The storage capacity of the dither matrix storage section 173 is a fixed amount (upper limit size) corresponding to the capacity necessary for storing the four dither matrices, and it is possible to appropriately allocate a memory to each dither matrix by an arbitrary ratio to change the contents within a range that the total size of the four dither matrices are equal to or less than the fixed amount.

The size of dither matrix for an image of each color is set so that all of the artifacts in the images of colors which are screen-processed are difficult to recognize.

Generally, there is a cycle length of space configuration which is easily recognized by human's eyes. As a model expression indicating such cycle length, the visual transfer function (VTF) is used. In the model expression used in the embodiment, the easiness in visual recognition of patterns (visibility) is obtained by the distance l (mm) from the observer to the space configuration and the space frequency f ($mm^{-1}$) of pattern as in the expression (1).

$$VTF=5.05\times\exp(-0.138\times\pi lf/180)\times(1-\exp(-0.1\times\pi lf/180)) \quad \text{expression (1)}$$

When the distance l is 300 mm equivalent to a standard distance in a case where an observer observes a sheet of paper which is a recording medium equal to or smaller than A4, VTF reaches its local maximum when the spatial frequency f is approximately 1 ($mm^{-1}$), and VTF is decreased when the spatial frequency f (spatial cycle 1/f) is shorter or longer than 1 ($mm^{-1}$).

In a case where an image of 1200 dpi (dot per inch) is output, when the dither cycle is 64 pixels, the length is 1.35 mm, and thus, the pattern according to dither pattern is more difficult to visually recognize as the dither cycle becomes larger than 64 pixels, that is, as the spatial frequency f becomes smaller. Accordingly, by setting the size of dither matrix to be larger for a color which has a higher visibility, the pattern according to the dither pattern of the color with a high visibility is more difficult to recognize. For the color having a low visibility, even when the size of dither matrix is not so large, the pattern according to the dither pattern is not easily recognized at the same degree with the color having a high visibility.

In the dither matrix setting section 172 of the image forming apparatus 100, for the color which is largely different from the background color (normally, white color) in brightness, chroma and hue, the size of dither matrix is set to be larger than the other colors. Here, compared to each of the colors C, M and Y, the color K has the largest difference in brightness, and thus, the size of dither matrix for the color K is set to be large. The color Y has the smallest difference in brightness, and thus, the size of dither matrix for the Y color image may be smaller than dither matrices for the other color images.

Here, when the image resolution which can be output by the image forming section 19 is larger than 1200 dpi, for example, even at 2400 dpi, the dither matrices can be configured so that each component is applied at the resolution of 1200 dpi in the screen processing. In such way, by setting the resolution of each of the dither matrices to be equal to or less than the output resolution, it is also possible to make the output unevenness (patterns) according to the dither patterns less conspicuous.

Figure 2:
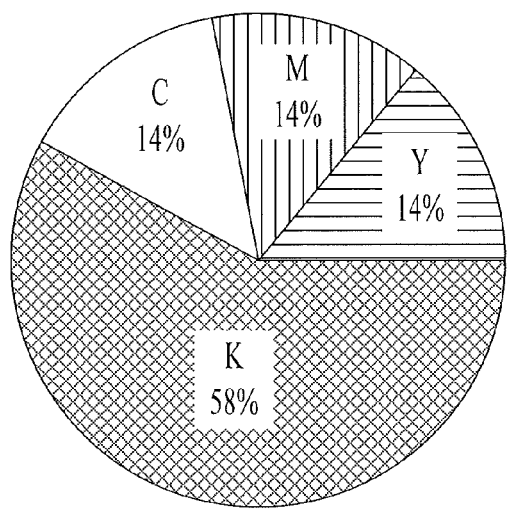
FIG. 2 is a view showing an example of memory allocation amounts for dither matrices of images of respective colors stored in a dither matrix storage section.

FIG. 2 is an example of a view showing a ratio of memory allocation amount of the dither matrix for each color image stored in the dither matrix storage section 173.

In the example, the memory allocation amount, that is, the size of dither matrix for the color K image which has a relatively high visibility than the three colors C, M and Y, is four times of the memory allocation amount (size) of the dither matrix corresponding to each of the three color images of C, M and Y. That is, when each of the dither matrices is a square matrix, the number of lines and rows of dither matrix for the K color image is twice the number of lines and rows of dither matrix for each of the other three color images. For example, it is possible to generate each of the dither matrices used for the three color images of C, M and Y as a matrix of 256×256 and the dither matrix used for the K color image as 512×512, and store them in the dither matrix storage section 173.

Here, the dither matrices are set efficiently by setting the sizes of dither matrices as powers of 2; however, the size of each dither matrix is not necessarily limited to the power of 2.

The degree of visibility for each of the colors Y, M, C and K can vary on the basis of setting of background color and such like. That is, when the color of recording medium to form an image is not white, for example, a dark color, the visibility of K color image with respect to the background color is largely lowered while the visibility of Y color image with respect to the background color is largely increased. When the image forming section 19 is used over a long period, the visibility of each color is changed depending on the use.

The dither matrix setting section 172 can update the setting while changing the memory amount allocation ratio of the dither matrix for each color image according to the temporal or long-term change in visibility.

Furthermore, the visibility of each of the colors Y, M, C and K also varies according to the characteristics of image forming section 19 and the type of toner. Accordingly, it is also possible to directly input the size of each dither matrix according to the image forming section 19 via the operation section 13, allocate a memory corresponding to the size to generate or read out the dither matrix, and store the dither matrix when performing a test of image forming apparatus 100 before shipment or after repair, and thereafter perform shipment.

As described above, in order to appropriately set a memory allocation amount to each dither matrix according to the output condition of image, it is possible to increase or decrease the amount by a predetermined weighting with respect to a predetermined reference amount by obtaining a parameter according to the background color of recording medium, or a parameter indicating a use history of image forming section 19, which is, for example, a value obtained by a counter counting the number of times the image forming unit for each color is used, in addition to by the user directly specifying and inputting the size. In these cases, the parameter according to the background color of recording medium can be calculated by the CPU of the image processing section 17 on the basis of the background color which is set by the user, for example. Further, as for the parameter indicating a use history, data held by the image forming section 19 or the image processing section 17 is automatically obtained by predetermined intervals and the obtained parameter can be reflected to the arrangement of memory allocation amount for the dither matrices.

Figure 3:
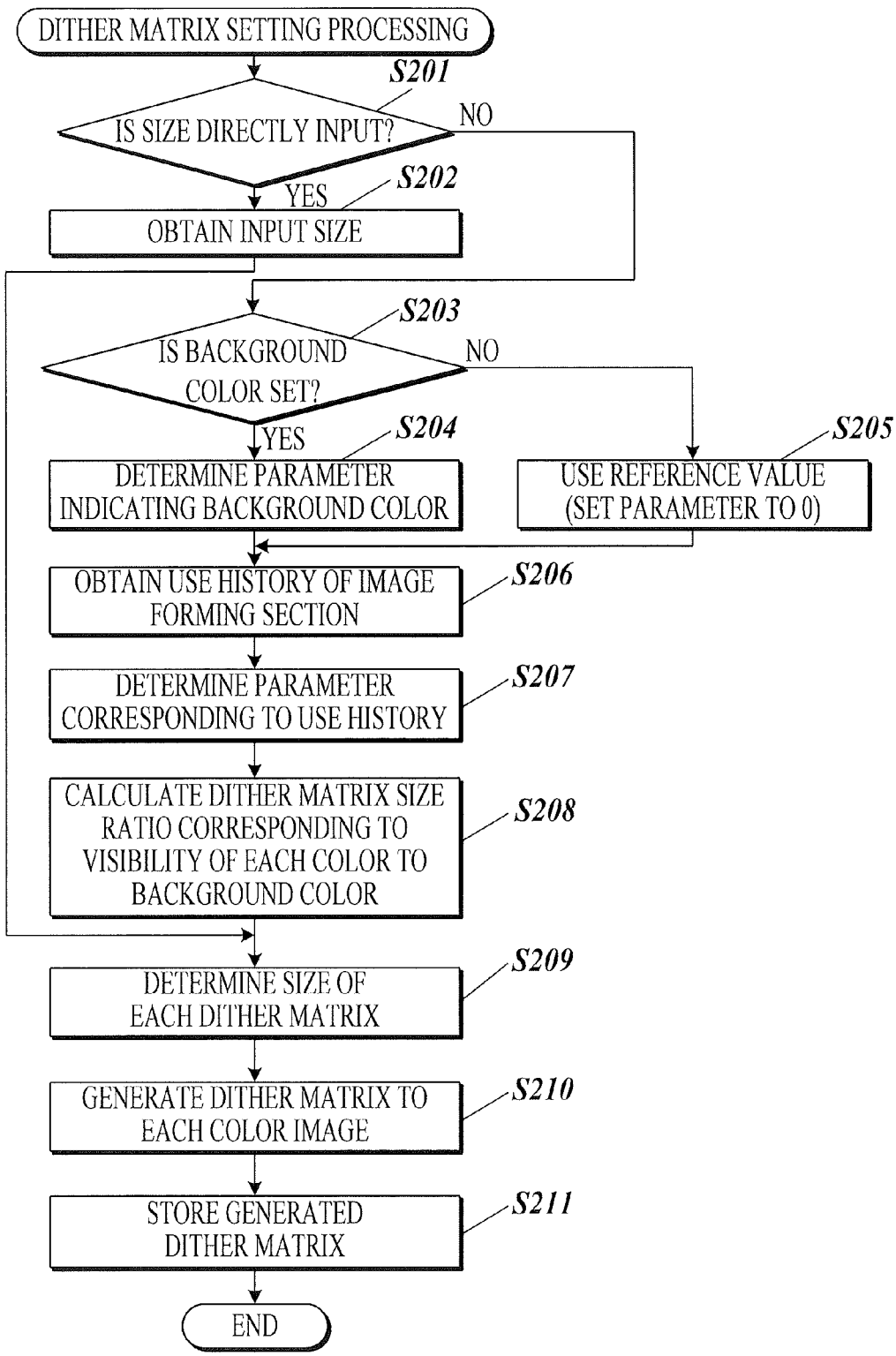
FIG. 3 is a flow chart showing a control procedure of dither matrix setting processing.

FIG. 3 is a flowchart showing a control procedure of dither matrix setting processing by the dither matrix setting section 172 (CPU of the image processing section 17).

The dither matrix setting processing is started by activating a dither matrix setting program read out from the storage unit of the image processing section 17.

When the dither matrix setting processing starts, the CPU of the image processing section 17 first determines whether the size of each dither matrix is directly input (step S201). If it is determined that the dither matrix size is directly input (step S201: YES), the CPU obtains the input size of the dither matrix (step S202). Then, the processing of CPU shifts to step S209.

If it is not determined that the dither matrix size is directly input (step S201: NO), the CPU determines whether there is a setting of background color of recording medium on which image formation is to be performed (step S203). If it is determined that there is a setting of background color (step S203: YES), the CPU determines the parameter corresponding to the background color (step S204). On the other hand, if it is not determined that there is a setting of background color (step S203: NO), the CPU sets the background color to the reference color (white color) and sets the parameter to "0" so that the parameter makes no influence (step S205).

Following the processing in steps S204 or S205, the CPU obtains the operation history (use history) of each image unit of the image forming section 19 (step S206). The CPU determines the parameter corresponding to the obtained operation history (step S207).

The CPU calculates the memory allocation ratio (size ratio) for dither matrix of each toner color corresponding to the visibility with respect to the background color on the basis of the parameters set in steps S204, S205 and S207 (step S208). The CPU sets the size of each dither matrix which can be generated by the calculated memory allocation ratio on the basis of the maximum storage capacity of dither matrix storage section 173 (step S209). Alternatively, if the size of dither matrix is directly input in the processing of step S202, the CPU sets the input size as the size of dither matrix corresponding to each color image.

The CPU allocates a storage area of dither matrix for each color image to the dither matrix storage section 173 by the calculated memory ratio, and generates the dither matrix in each size which is set (step S210). The CPU can generate dither matrices by conventional known various techniques or read out preset dither matrices from the storage unit of image processing section 17. Then, the CPU stores the generated dither matrix in each allocated memory area of the dither matrix storage section 173 (step S211). The CPU ends the dither matrix setting processing.

Next, operations of the screen processing will be described.

Figure 4:
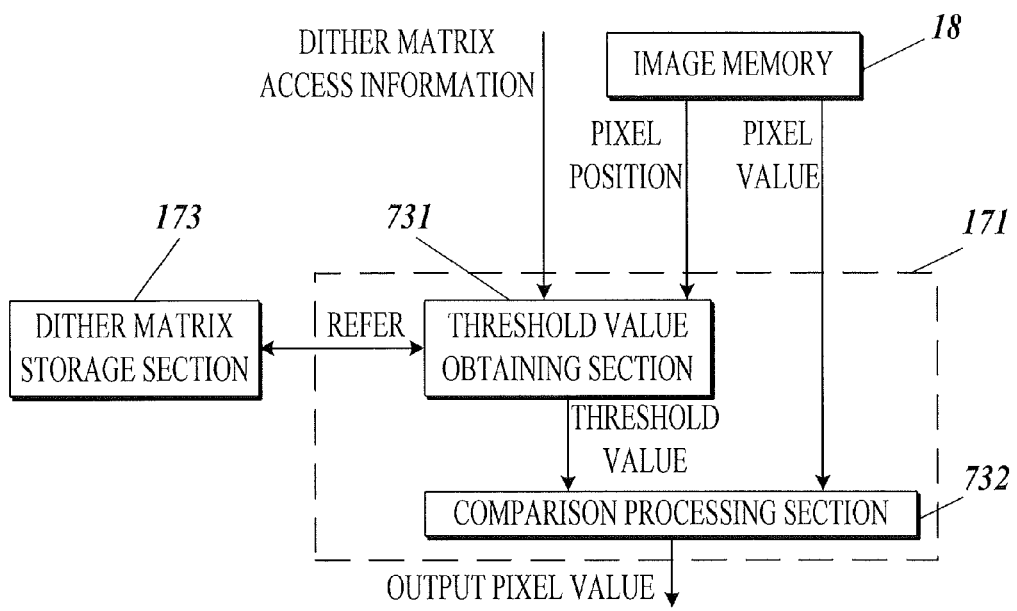
FIG. 4 is a block diagram showing operation contents of screen processing using the set dither matrix.

FIG. 4 is a block diagram showing operation contents of screen processing in the screen processing section 171 using the set dither matrices.

In the screen processing section 171, when the screen processing is started, the threshold value obtaining section 731 first determines the dither matrix which is an access target according to the specified color of the output image. Next, each pixel position in the image which is the processing target is specified in order from the head, and the threshold value obtaining section 731 refers to the dither matrix storage section 173 to access the data of component corresponding to the pixel position and obtains the threshold value.

Then, the screen processing section 171 accesses the image memory 18 to obtain a pixel value of the pixel position which is the processing target in the input image data, the comparison processing section 732 compares the pixel value with the threshold value obtained before, and thereby the output pixel value is obtained.

By repeatedly performing the processing of obtaining an output pixel value for all the pixel positions, the screen processing is finished.

As described above, the image processing section 17 in the embodiment has a configuration in which the screen processing section 171 performs screen processing by the dither matrices respectively set for image data of the colors C, M, Y and K. The image processing section 17 includes a dither matrix setting section which sets the dither matrices for the respective colors so that the total size thereof is equal to or less than the fixed size, and the dither matrix storage section 173 which stores the set plurality of dither matrices. That is, it is possible to easily change the size ratio of dither matrices for the color images and allocate a memory as a priority to the dither matrix for a color image which needs a large size. Accordingly, it is possible to easily set a dither matrix with an appropriate size for each color image depending on the condition of image formation without increasing the storage capacity.

It is also possible to easily divide the storage capacity and efficiently use the storage capacity by setting each of the arrangement numbers of dither matrices to a power of 2.

The dither matrix setting section 172 sets the memory allocation ratio so as to provide the largest memory allocation amount to the dither matrix for the color image, among the dither matrices for C, M, Y and K color images, which has the highest visibility with respect to the conditions according to image formation such as a background color of recording medium and use history of the image forming section 19. Accordingly, the visibility is reduced by the size of dither matrix for the color image, as a priority, which has a high visibility of artifacts such as unevenness in density due to the cycle of dither matrix, and thereby the visibility of artifacts as a whole can be reduced in a balanced manner.

By distributing a memory at a larger ratio to a dither matrix of a color having a higher visibility with respect to the conditions according to image formation and setting the dither matrix, the visibility of artifacts can be reduced further in a balanced manner and uniformly. Thus, it is possible to reduce the visibility of artifacts in a balanced manner while using the storage capacity of dither matrix storage section 173 efficiently.

The apparatus also includes the operation section 13 which receives user's input operation, and the dither matrix setting section 172 sets a dither matrix which is determined on the basis of the input size. Accordingly, the user can arbitrary perform setting by an input operation to distribute the dither matrices in appropriate sizes for the respective color images in a case where the standard dither matrix sizes are not suitable such as a case where the conditions according to the image formation are temporarily changed, or a case where the use of color or the form of the formed image are special.

When the resolution of output image according to image formation is sufficiently high, the dither matrix setting section 172 can generate a dither matrix at a resolution smaller than the resolution. Thus, it is possible to set a dither matrix in an unwasted and appropriate size within a range of reducing the visibility of artifacts due to the dither patterns to a necessary level.

The present invention is not limited to the above embodiment, and various changes can be made.

For example, though the embodiment is described by citing, as an example, color image output of CMYK four colors, the present invention is not limited to this. The number of colors can be appropriately set.

The embodiment has been described for the image forming apparatus which fixes toner onto a recording medium by using the exposure unit, developing unit and photoreceptor; however, the present invention is not limited to this. Even for halftone processing in an ink-jet type image forming apparatus which ejects ink, the present invention can be applied in a case where unevenness according to the dither patterns is to be suppressed.

The image processing section 17 in the embodiment may be provided independently from the image forming apparatus 100 so as to be able to output a screen-processed image while switching the distribution of memories for respective plurality of image forming apparatuses.

The above description takes, as an example, an HDD as a computer readable medium of the dither matrix setting program according to the processing operations of dither matrix setting section 172 according to the present invention; however, the present invention is not limited to this. As another computer readable medium, a portable recording medium such as a non-volatile memory such as a flash memory, SSD (Solid State Drive) and CD-ROM can be applied. The carrier wave is also applied to the present invention as a medium for providing data of programs according to the present invention via a communication line.

The other specifics of the configurations, control procedures and control contents shown in the embodiment can be appropriately changed within a scope of the present invention.

The entire disclosure of Japanese Patent Application No. 2013-262179 filed on Dec. 19, 2013 including description, claims, drawings, and abstract are incorporated herein by reference in its entirety.

What is claimed is:

1. An image processing apparatus which sets threshold value matrices for performing screen processing using the threshold value matrices for respective pieces of image data for a plurality of colors according to an output image, the apparatus comprising:
an allocation section which distributes and allocates memories to the respective threshold value matrices used for the respective pieces of the image data for the plurality of colors within a range that a total of memory allocation amounts to the threshold value matrices is equal to or less than a predetermined upper limit size;
a setting section which sets the threshold value matrices in sizes according to the respective memory allocation amounts; and
a storage section which stores the set plurality of threshold value matrices in respective allocated memory areas,
wherein the allocation section sets the memory allocation amounts to the plurality of threshold value matrices so as to set a largest memory allocation amount to a threshold value matrix for an image of a color, among the threshold value matrices for images of the plurality of colors, which has a highest visibility with respect to a condition according to image formation.

2. The image processing apparatus of claim 1, wherein the setting section sets an arrangement number of each of the threshold value matrices to be a power of 2.

3. The image processing apparatus of claim 1, wherein the allocation section allocates the memories to the threshold value matrices for the image data of the plurality of colors so as to allocate a memory, at a larger memory allocation ratio, to a threshold value matrix for an image of a color having a higher visibility with respect to the condition according to the image formation.

4. The image processing apparatus of claim 1, wherein the setting section sets a resolution of a threshold value matrix to be equal to or less than a resolution according to image formation of the image data.

5. An image processing method of an image processing apparatus which sets threshold value matrices for performing screen processing using the threshold value matrices for respective pieces of image data for a plurality of colors according to an output image, the method comprising:
distributing and allocating memories to the respective threshold value matrices used for the respective pieces of the image data for the plurality of colors within a range that a total of memory allocation amounts to the threshold value matrices is equal to or less than a predetermined upper limit size;
setting the threshold value matrices in sizes according to the respective memory allocation amounts; and
storing the set plurality of threshold value matrices in respective allocated memory areas,
wherein, in the distributing and allocating, the memory allocation amounts to the plurality of threshold value matrices are set so as to set a largest memory allocation amount to a threshold value matrix for an image of a color, among the threshold value matrices for images of the plurality of colors, which has a highest visibility with respect to a condition according to image formation.

6. The image processing method of claim 5, wherein an arrangement number of each of the threshold value matrices is set to be a power of 2 in the setting.

7. The image processing method of claim 5, wherein, in the distributing and allocating, the memories to the threshold value matrices for the image data of the plurality of colors are allocated so as to allocate a memory, at a larger memory allocation ratio, to a threshold value matrix for an image of a color having a higher visibility with respect to the condition according to the image formation.

8. The image processing method of claim 5, wherein, in the setting, a resolution of a threshold value matrix is set to be equal to or less than a resolution according to image formation of the image data.

9. A non-transitory computer readable recording medium storing a program that makes a computer, which performs image processing to set threshold value matrices for performing screen processing using the threshold value matrices for respective pieces of image data for a plurality of colors according to an output image, function as:
an allocation section which distributes and allocates memories to the respective threshold value matrices used for the respective pieces of the image data for the plurality of colors within a range that a total of memory allocation amounts to the threshold value matrices is equal to or less than a predetermined upper limit size;
a setting section which sets the threshold value matrices in sizes according to the respective memory allocation amounts; and
a storage section which stores the set plurality of threshold value matrices in respective allocated memory areas,
wherein the allocation section sets the memory allocation amounts to the plurality of threshold value matrices so as to set a lamest memory allocation amount to a threshold value matrix for an image of a color, among the threshold value matrices for images of the plurality of colors, which has a highest visibility with respect to a condition according to image formation.

10. The non-transitory computer readable recording medium storing the program of claim 9, wherein the setting section sets an arrangement number of each of the threshold value matrices to be a power of 2.

11. The non-transitory computer readable recording medium storing the program of claim 9, wherein the allocation section allocates the memories to the threshold value matrices for the image data of the plurality of colors so as to allocate a memory, at a larger memory allocation ratio, to a threshold value matrix for an image of a color having a higher visibility with respect to the condition according to the image formation.

12. The non-transitory computer readable recording medium storing the program of claim 9, wherein the setting section sets a resolution of a threshold value matrix to be equal to or less than a resolution according to image formation of the image data.

* * * * *